(12) United States Patent
Auld et al.

(10) Patent No.: US 7,028,144 B2
(45) Date of Patent: Apr. 11, 2006

(54) METHOD AND APPARATUS FOR AN IN-SITU VICTIM CACHE

(75) Inventors: William G. Auld, Portland, OR (US); Zhong-Ning Cai, Lake Oswego, OR (US)

(73) Assignee: Intel Corporation, Santa Clara, CA (US)

( * ) Notice: Subject to any disclaimer, the term of this patent is extended or adjusted under 35 U.S.C. 154(b) by 301 days.

(21) Appl. No.: 10/696,074

(22) Filed: Oct. 28, 2003

(65) Prior Publication Data

US 2005/0091457 A1    Apr. 28, 2005

(51) Int. Cl.
*G06F 12/12*    (2006.01)
(52) U.S. Cl. ....................... 711/144; 711/134
(58) Field of Classification Search ................ 711/144, 711/133, 134
See application file for complete search history.

(56) References Cited

U.S. PATENT DOCUMENTS 5,564,035 A * 10/1996 Lai ............................ 711/144
6,061,765 A * 5/2000 Van Doren et al. ......... 711/145
6,128,702 A * 10/2000 Saulsbury et al. .......... 711/133
6,249,846 B1 * 6/2001 Van Doren et al. ......... 711/144
2004/0215890 A1 * 10/2004 Cargnoni et al. ........... 711/136

OTHER PUBLICATIONS

Barroso, L.A. et al., "Piranha: a scalable architecture based on single-chip multiprocessing", Proceedings of the 27th Annual International Symposium on Computer Architecture, Vancouver, BC, Canada, pp. 282-293 (Jun. 10-14, 2000).

* cited by examiner

*Primary Examiner*—Kevin L. Ellis
(74) *Attorney, Agent, or Firm*—Blakely, Sokoloff, Taylor & Zafman LLP (57) ABSTRACT

A method and apparatus for a microprocessor with a cache that has the advantages given by a victim cache without physically having a victim cache is disclosed. In one embodiment, a victim flag may be associated with each way in a set. At eviction time, the way whose victim flag is true may be evicted. However, the victim flag may be reset to false if a superceding request arrives for the cache line in that way. Another cache line in another way may then have its victim flag made true.

22 Claims, 7 Drawing Sheets

METHOD AND APPARATUS FOR AN IN-SITU VICTIM CACHE

FIELD

The present disclosure relates generally to microprocessors, and more specifically to microprocessors utilizing a cache hierarchy.

BACKGROUND

Modern microprocessors often use a cache hierarchy. In a hierarchy of caches, inner caches, those more closely connected to a processor, may give rapid access to instructions and data but may have limited storage capacity. Outer caches, those more closely connected to system memory, may have much larger storage capacity but much larger latency for requests from the processor. No matter whether they are inner caches or outer caches, caches generally face the problem of the replacement of cache lines that are no longer needed with new cache lines representing newer memory requests from the processor. When there are cache lines in an invalid state, these may be replaced with new cache lines without much system performance impact. But when no cache lines are in an invalid state, the cache control logic must pick a cache line in a valid state, called a victim cache line, and overwrite it with the new cache line. This presents a system performance issue in that a cache line discarded as a victim may soon be requested again by the processor, and may need to be fetched once again.

There are several existing methods of selecting a victim cache line when needed. One commonly used one is the least-recently-used (LRU) method, where the cache line selected as the victim cache line is the one which has been unused for the longest time. However, when used in an outer cache, the LRU method may give poor results because what may be important is which cache lines have been unused by the inner caches, and the outer caches may not have access to this information. Similarly, random victim selection and first-in-first-out (FIFO) victim selection methods may have drawbacks.

One approach to dealing with poorly-chosen victim cache lines utilizes a small buffer called a victim cache, connected between its related cache and the refill path. The victim cache may contain the victim cache lines that were recently overwritten in the related cache. The victim cache may be checked on a cache line miss, and if found in the victim cache the requested cache line may be swapped with another cache line in the related cache. This may reduce the latency of fetching the requested cache line from more outer caches or system memory, but at the cost of the complexity of the victim cache and its associated logic. As the victim cache may need to ensure cache coherency, this cost may be relatively high.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

The following disclosure describes techniques for a cache to select and validate victim cache lines without the use of an external victim cache. In the following description, numerous specific details such as logic implementations, software module allocation, bus signaling techniques, and details of operation are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation. The invention is disclosed in the form of a processor using caches in a linear hierarchy. However, the invention may be practiced in other configurations of caches, such as shared outer caches servicing a multi-core processor architecture.

Figure 1:
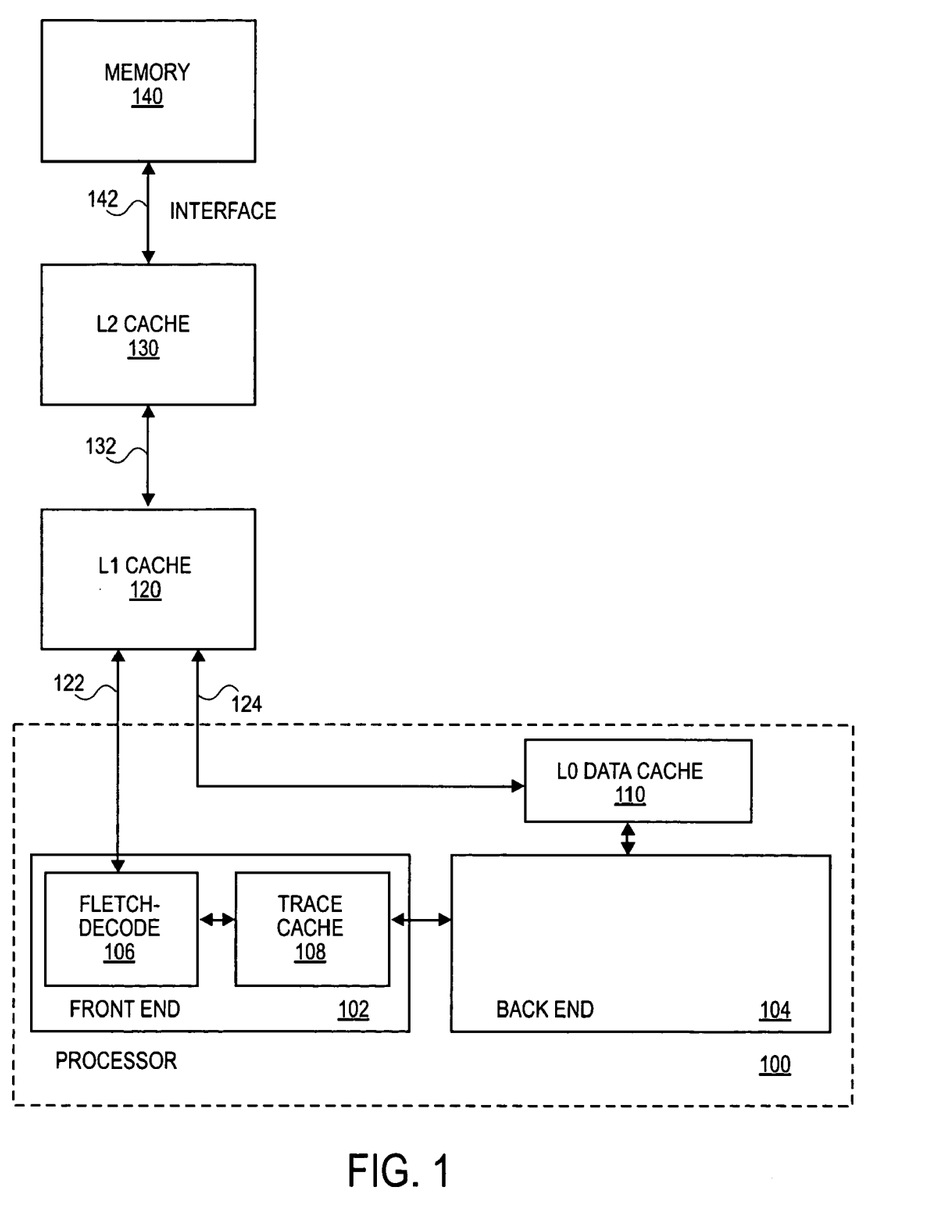
FIG. 1 is a schematic diagram of a cache hierarchy, according to one embodiment.

Referring now to FIG. 1, a schematic diagram of a cache hierarchy is shown, according to one embodiment. The FIG. 1 processor 100 may include a front end 102 and a back end 104. The front end 120 may include a fetch/decode stage 106. The fetch/decode stage 106 may fetch (and potentially prefetch) instructions from a memory hierarchy that may in one embodiment include an L1 (level one) cache 120, an L2 (level two) cache 130, and memory 140. In the FIG. 1 embodiment, L1 cache 120 and L2 cache 130 are shown as unitary caches, where a unitary cache is one that may store both instructions and data. In other embodiments, other forms of memory hierarchy may be used.

The fetch/decode stage 106 may also decode the instructions. In one embodiment, macro-instructions may be decoded into sets of micro-operations. The front end 102 may also include some kind of inner cache to store instructions. In some embodiments, this may take the form of an L0 (level zero) instruction cache or an instruction buffer. In the FIG. 1 embodiment, a trace cache 108 is used. In one embodiment, trace cache 108 may store linked sets of micro-operations called traces. Each macro-instruction may be stored in trace cache 108 in decoded form as one or more corresponding traces.

The back end 104 may receive macro-instructions or micro-operations from the front end 102 and act upon them. In one embodiment, back end 104 may include a register alias table to translate logical register addresses to physical register addresses. Back end 104 may also include a scheduler to issue instructions, including micro-operations, in an order to suit pipeline execution. A register file read/bypass stage may be included to permit reading operand values from the physical register addresses, and may also support operands from a bypass circuit within back end 104. An execution stage may execute the instructions, and may include several execution units for the execution of several instructions in parallel. After execution, the instructions may be checked for branch misprediction, exceptions, and other execution anomalies in a check stage. Instructions whose execution passes the checks may then be retired in a retirement stage, which may update the processor state as appropriate. Data required by the back end 104 may be supplied by an L0 data cache 110.

The interface 142 between the outer L2 cache 130 and memory 140 may be of various kinds. In one embodiment, interface 142 may be a system bus of some variety. In other embodiments, a point-to-point memory interface may be used to enhance performance. In FIG. 1, L2 cache 130 is shown supporting only one set of inner caches (L1 cache 120, trace cache 108, and L0 data cache 110). In other embodiments, processor 100 may share L2 cache 130 with other processors. In some embodiments, processor 100 may be one of several processors in a multi-core processor module. It may be noted that L2 cache 130 is an outer cache with respect to L1 cache 120, trace cache 108, and L0 data cache 110. L1 cache 120 is an inner cache with respect to L2 cache 130 but is also an outer cache with respect to trace cache 108 and L0 data cache 110. Trace cache 108 and L0 data cache 110 are inner caches with respect to both L2 cache 130 and L1 cache 120.

Figure 2A:
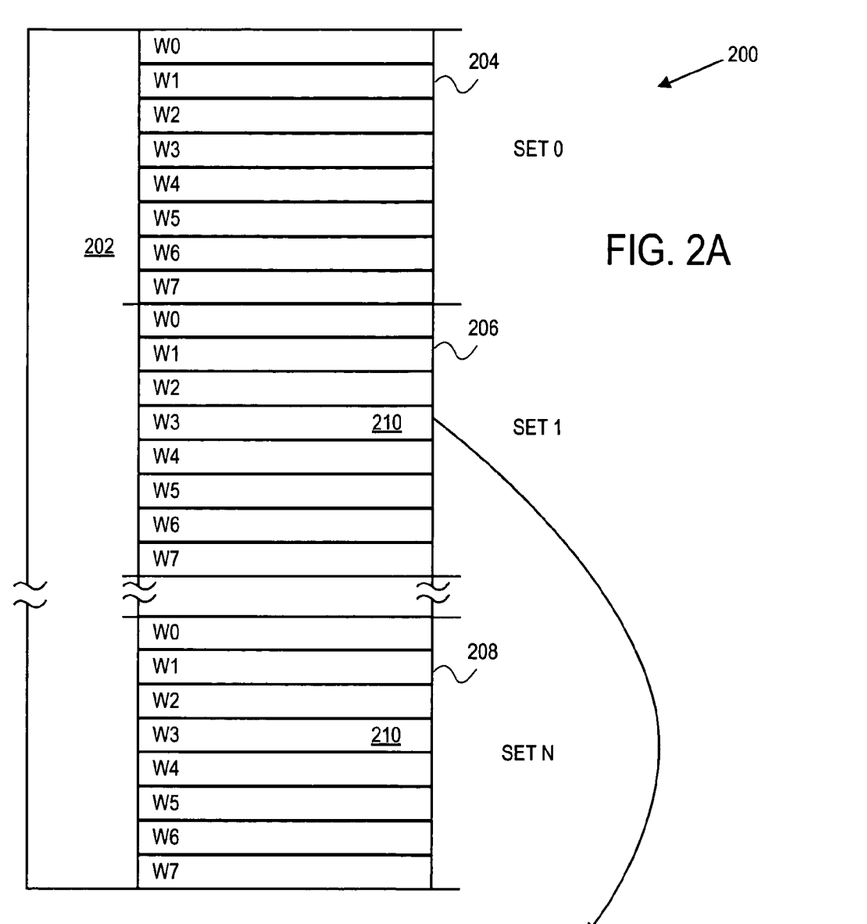
FIGS. 2A and 2B are schematic diagrams of cache lines in a cache, according to one embodiment.
Figure 2B:
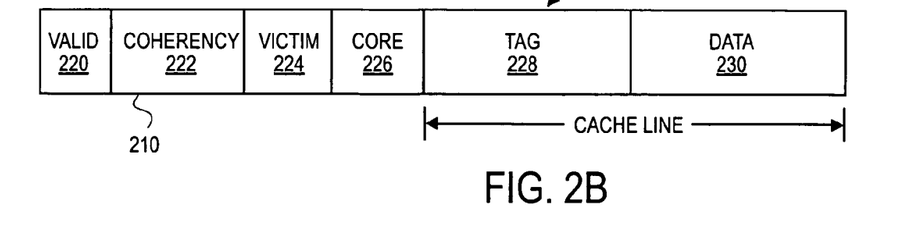

Referring now to FIGS. 2A and 2B, schematic diagrams of cache lines in a cache 200 are shown, according to one embodiment. Cache 200 may serve as, for example, the L2 cache 130 or the L1 cache 120 of FIG. 1, or in many other embodiments of a cache. Cache 200 is shown as an 8-way set-associative cache with N sets. However, in other embodiments the cache could have other numbers of ways in each set, or could be a fully-associative cache.

The individual sets of cache 200, from set 0 204 through set N 208, each include 8 ways, labeled W0 through W7, where each way is capable of storing a cache line. For example, in set 1 206, way W3 210 may include a cache line including data 230 and tag 228. The data 230 may include various data words and instructions. The tag 228 may include a tag proper, an index, and a block offset. In other embodiments, tag 228 may include different information. In some embodiments, way W3 210 may include a core identification field 226 when cache 200 may be used with multiple cores in a multi-core processor. Core identification field 226 may be used to limit back-invalidations to lower-level caches only to those cores that may require them.

In one embodiment, way W3 210 may include cache coherency bits 222 to indicate the cache coherency status of the cache line contained therein. In embodiments using a protocol that uses the modified/exclusive/shared/invalid (MESI) states, cache coherency bits 222 may encode these states. In other embodiments, other states could be encoded in cache coherency bits 222. The validity of the cache line contained in way W3 210 may be indicated by a valid flag associated with way W3 210. In one embodiment, a decoded valid bit 220 may be made true to indicate a valid cache line and made false to indicate an invalid cache line. In other embodiments, the cache coherency bits 222 may be used as an encoded valid flag. For example, in one embodiment when cache coherency bits 222 include a pattern indicating an M, an E, or an S state, the valid flag may be considered true to indicate a valid cache line. When the cache coherency bits 222 include a pattern indicating an I state, the valid flag may be considered false to indicate an invalid cache line.

Way W3 210 may also include a victim flag. In one embodiment, a decoded victim bit 224 may be made true to indicate a victim cache line and made false to indicate a non-victim cache line. In other embodiments, a set of bits associated with each set may indicate in encoded form which way of the set may include a victim cache line. The control of the victim flag may be accomplished by the cache control logic 202. In one embodiment, cache control logic 202 may always make true a victim flag within each set, and the way referred to by the victim flag may be selected using a well-known victim selection method such as the least-recently-used (LRU), random, or first-in-first-out (FIFO) methods. In another embodiment, cache control logic 202 will monitor the valid flag of each way in a set, and only make true a victim flag when none of the valid flags is false. When a replacement cache line is needed for a given set within cache 200, the cache control logic 202 may first determine whether any of the ways has its valid flag false. If so, one of those ways may be overwritten with the replacement cache line. If not, then the way whose victim flag is true may be overwritten by the replacement cache. However, the mere making true of a victim flag of a way does not mean that the cache line therein will definitely be evicted or overwritten: it should be considered an indicator that that cache line is a potential and pending victim cache line.

Whenever a victim flag is made true, the cache control logic 202 may send a back-invalidate signal to any inner caches of cache 200. In one embodiment, the back-invalidate signal may be necessary in an inclusive cache hierarchy. However, the cache control logic 202 will send the back-invalidate signal without waiting for an actual eviction from the way whose victim flag is true.

Figure 3:
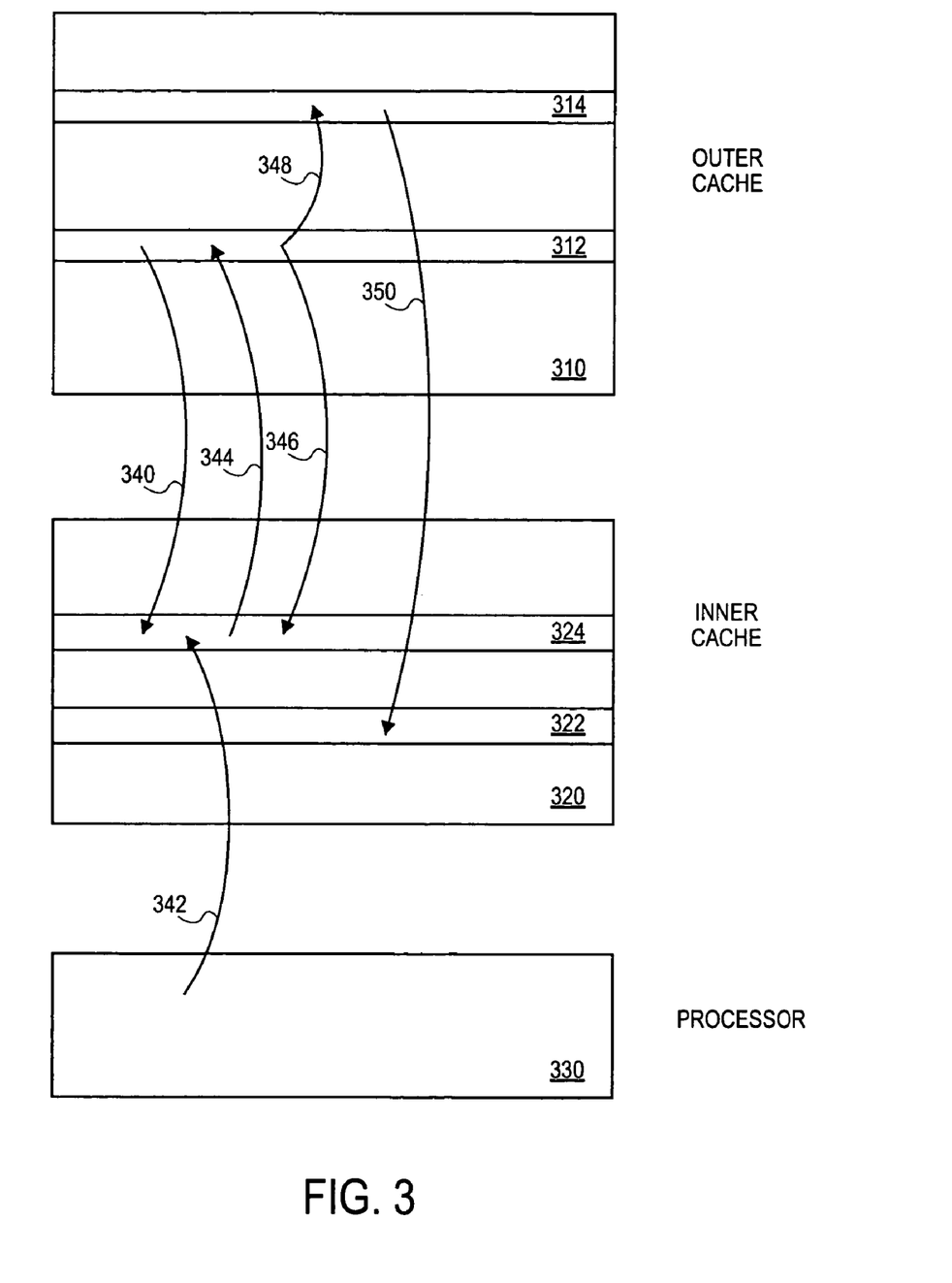
FIG. 3 is a schematic diagram of messages and transactions between outer and inner caches, according to one embodiment of the present disclosure.

Referring now to FIG. 3, a schematic diagram of messages and transactions between outer and inner caches is shown, according to one embodiment of the present disclosure. In the FIG. 3 embodiment, outer cache 310 and inner cache 320 are in an outer and inner relationship with each other and processor 330. For the sake of clarity, only one representative set is shown in each cache. In one embodiment, outer cache 310 may be the cache 200 of FIGS. 2A and 2B above.

In the FIG. 3 example, cache control logic has made true the victim flag of the cache line in way 312. A message 340 may be sent to inner cache 320 to back-invalidate any corresponding cache line within inner cache 320. Let way 324 contain a corresponding cache line to that contained in way 312. Then the cache line in way 324 may be invalidated.

At a later time, processor 330 may make a request 342 for that recently-invalidated cache line. As that cache line is now invalid within inner cache 320, a second request 344 may be sent to outer cache 310. When the cache control logic of outer cache 310 receives that second request 344, it may determine that that request is for a cache line in a way whose victim flag is true. Cache control logic may respond to this situation by making false the victim flag of way 312, making true the victim flag of another way, for example, way 314 (message 348), and by then sending the requested cache line from way 312 to the inner cache 320 (message 346). Since way 314 now has its victim flag true, a message 350 may be sent to inner cache 320 to back-invalidate any cache line within inner cache 320 corresponding to that in way 314. Let way 322 contain a corresponding cache line to that contained in way 314. Then the cache line in way 322 may be invalidated.

By making false the victim flag of way 312 and making true the victim flag of way 314, the cache control logic has reacted to a situation where, by the operation of the processor and its associated caches, a less than optimal selection of the cache line in way 312 as a potential victim was corrected by subsequently selecting the cache line in way 314 as an alternate victim. This process of selecting alternate victims may continue until such time as an actual eviction (or overwriting) takes place on the way whose victim flag is currently true. This process may thus be considered a corrective procedure to the original method of selecting a victim cache line, whether that method is LRU, random, FIFO, or another method.

Figure 4:
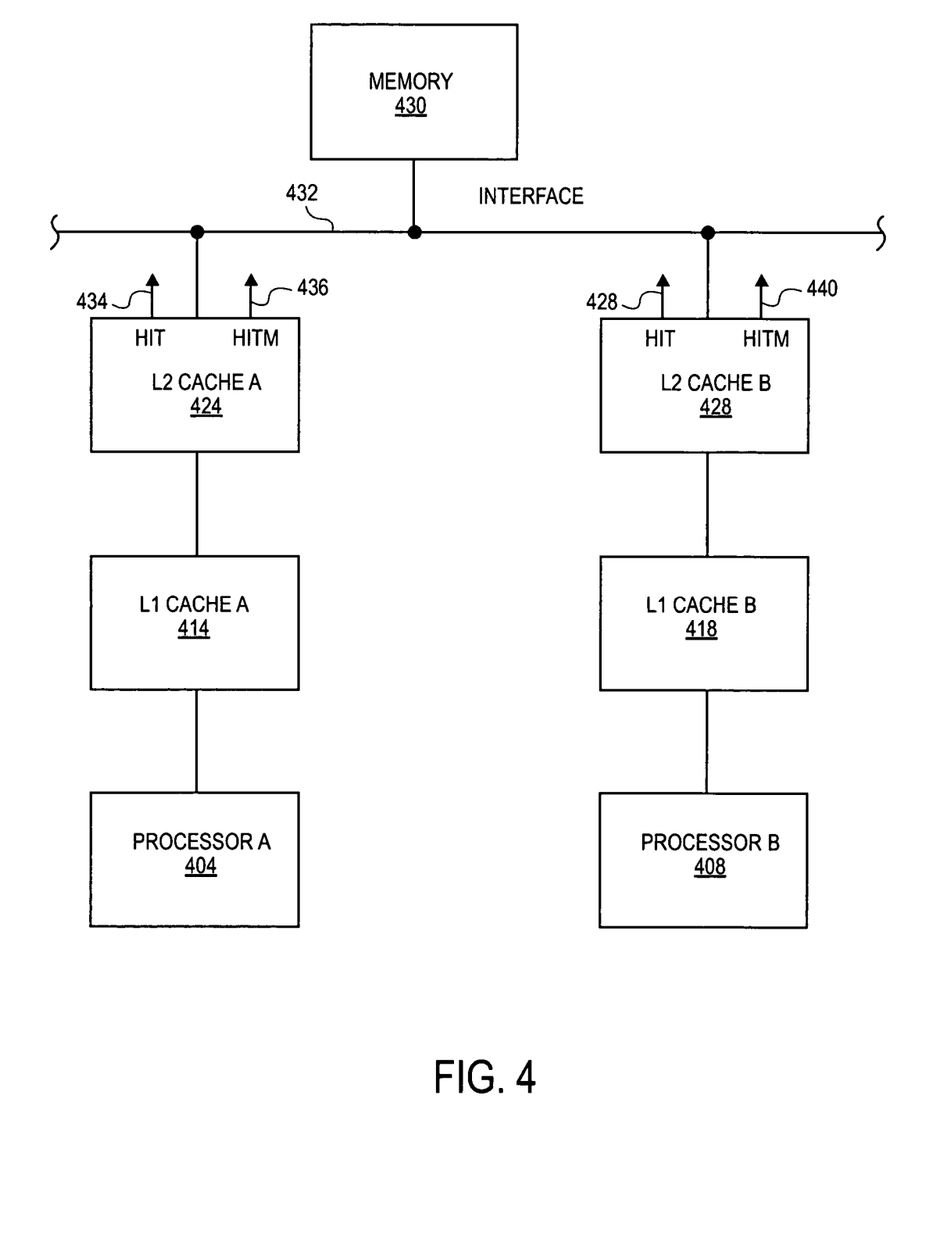
FIG. 4 is a schematic diagram of messages and transactions between coherent caches, according to one embodiment of the present disclosure.

Referring now to FIG. 4, a schematic diagram of messages and transactions between coherent caches is shown, according to one embodiment of the present disclosure. The FIG. 4 embodiment presumes that the caches shown are inclusive. When a particular cache line is requested by processor A 404, a request is sent to L1 cache A 414. If the cache line is not in L1 cache A 414, then a subsequent request is sent to L2 cache A 424. If the cache line is also not in L2 cache A 424, then a request may be made to memory 430: however, the L2 cache A 424 may first snoop other caches in the cache coherency domain to see if the desired cache line is present there.

If L2 cache B 428 has the desired cache line, in either an exclusive E state or a shared S state, then L2 cache B 428 may signal this to L2 cache A 424 by, among other actions, sending a "cache hit found" HIT 438 signal. L2 cache A 424 may then receive the desired cache line an a shared S state from L2 cache B 428. However, if L2 cache B 428 has the desired cache line in a modified M state, then L2 cache B 428 may signal this to L2 cache A 424 by, among other actions, sending a "cache hit modified found" HITM 440 signal. In this situation, L2 cache B 428 needs to invalidate the modified cache line, both by local invalidation and also by sending a back-invalidate message to all caches inner to L2 cache B 428, before sending the desired but modified cache line to L2 cache A 424. In the FIG. 4 embodiment, the inner cache shown is L1 cache B 418, so L2 cache B 428 sends a back-invalidate message to L1 cache B 418. The processing of this back-invalidate message may delay the sending of the modified cache line to L2 cache A 424.

In one embodiment, if the desired but modified cache line in L2 cache B 428 had the corresponding victim flag made true, then the back-invalidate process to inner caches had been performed at a previous time. Thus in the situation where the desired cache line is not only modified but also has its victim flag true, there may be no need to delay sending the modified cache line over to L2 cache A 424. Hence in this situation there may be a further performance enhancement when utilizing the victim flag.

Figure 5A:
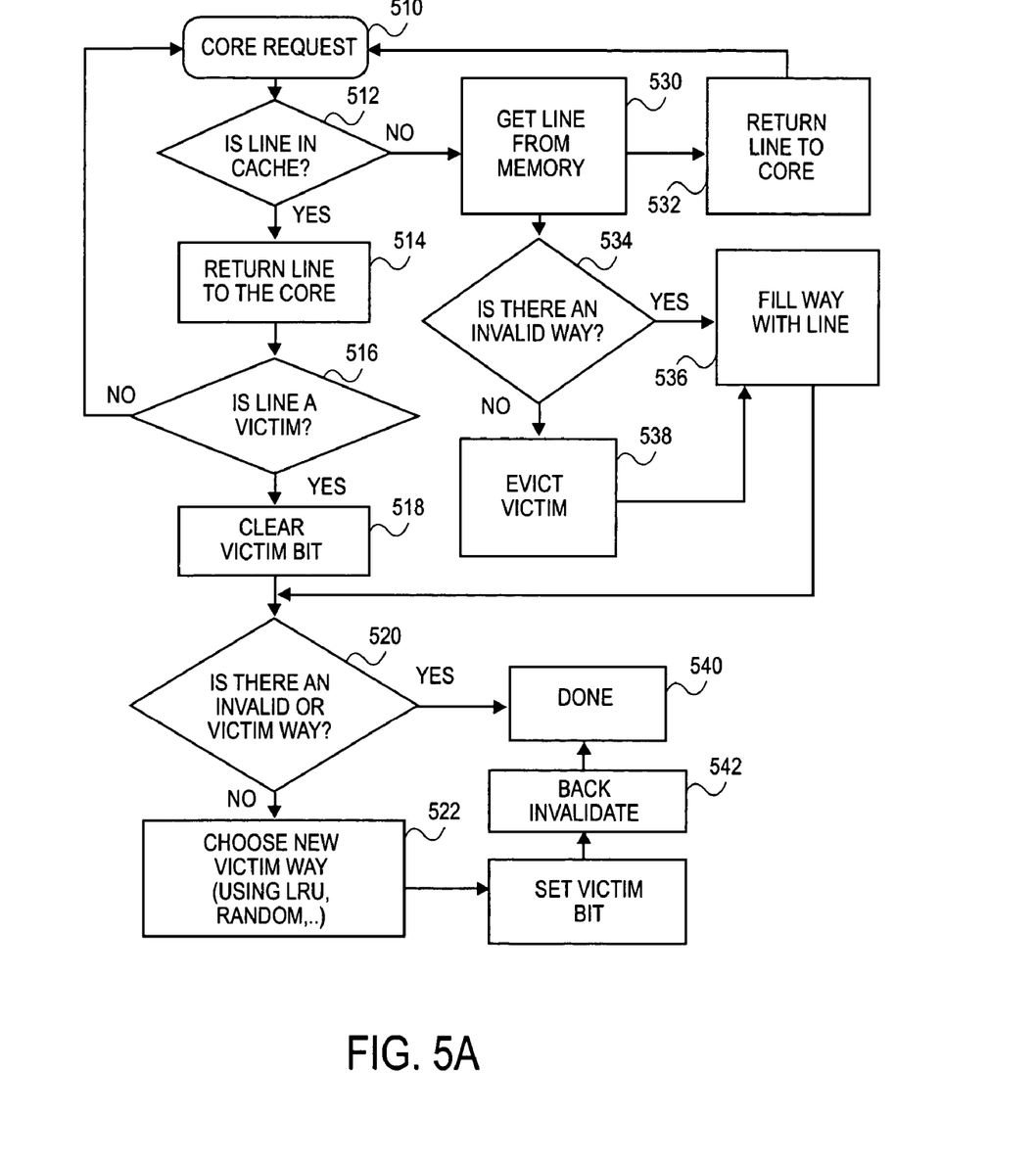
FIGS. 5A and 5B are flowcharts of a method of operation of an in-situ victim cache, according to one embodiment of the present disclosure.
Figure 5B:
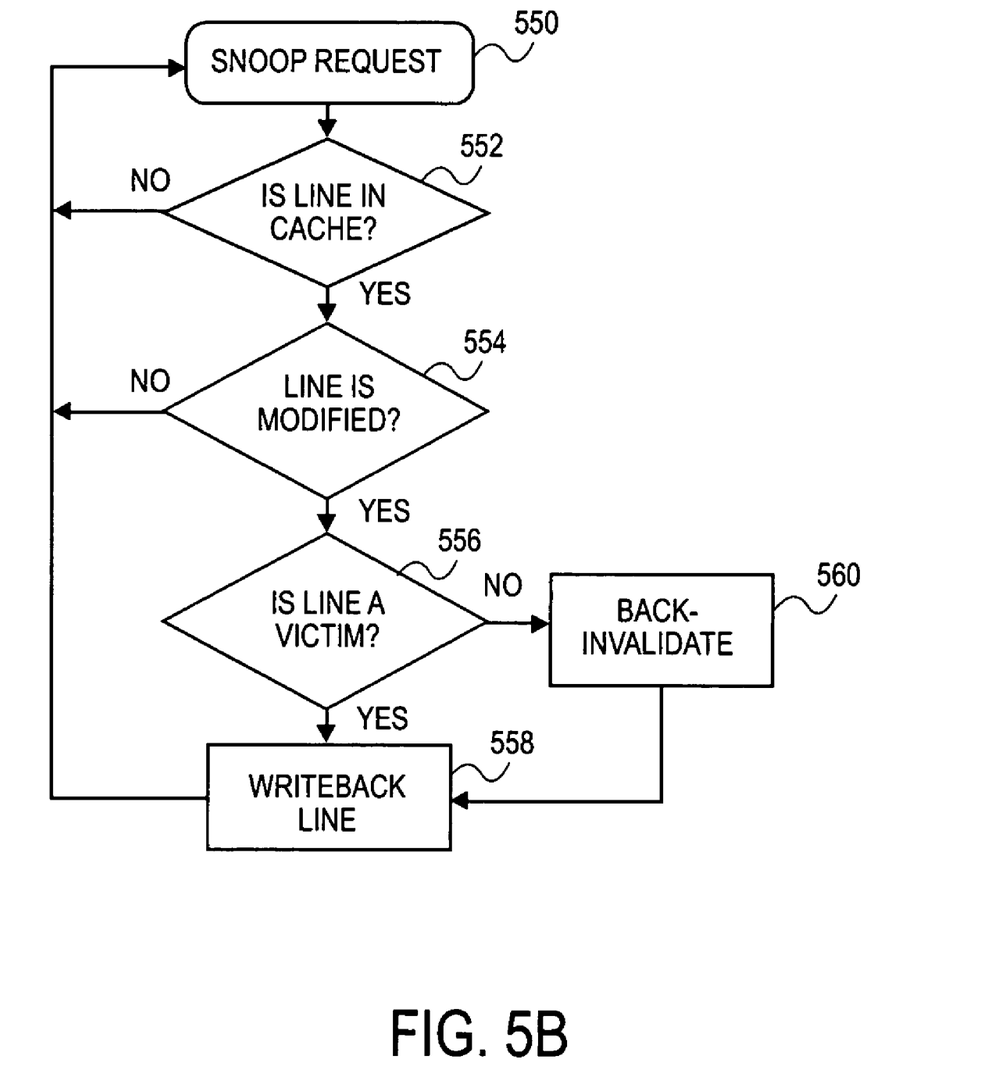

Referring now to FIGS. 5A and 5B, flowcharts of a method of operation of an in-situ victim cache are shown, according to one embodiment of the present disclosure. FIG. 5A generally shows a process when responding to a cache line request from a processor core, whereas FIG. 5B generally shows a process when responding to a cache line request from a snoop. The FIG. 5A process begins at block 510 with the request of a line from the processor core. In decision block 512, it is determined whether the requested line is resident in the cache. If so, the process exits decision block 512 via the YES path and the line is send down to the core in block 514. Then in decision block 516 it is determined whether the victim flag of that line is set true. If not, then the process exits decision block 516 along the NO path and the process repeats. If, however, the victim flag of that line is true, then the process exits decision block 516 along the YES path and in block 518 that victim flag is cleared (set false).

If, on the other hand, the requested line was not resident in the cache, then the process exits decision block 512 along the NO path and in block 530 the requested line is retrieved from memory. In block 532 that line may then be immediately forwarded to the processor core. Then in decision block 534 it is determined whether a way in the cache has its invalid flag set true. If so, then the process exits decision block 534 via the YES path and in block 536 that way receives the retrieved line. If not, then the process exits decision block 534 via the NO path. The process maintains a line with its victim flag set true when there is no line with an invalid flag set true, so in block 538 that line is evicted and then in block 536 the corresponding way receives the retrieved line.

The process enters decision block 520 from either block 518 or block 536. In decision block 520 it is determined whether there exists either a line with its victim flag set to true or its invalid flag set to true. If so, then the process exits along the YES path to completion in block 540. If not then the process exits along the NO path to block 522, where a line in a particular way is chosen to have its victim flag set to true in block 544. In block 542 that chosen line is back invalidated, and then the process completes in block 540.

In FIG. 5B, the process begins with a snoop request in block 550. In decision block 552 it is determined whether the requested line is in the cache. If not, then the process exits decision block 552 via the NO path and the process repeats without further action. If so, then the process exits decision block 552 via the YES path and in decision block 554 it is determined whether the requested line is in a modified state. If not, then the process exits decision block 554 via the NO path and the process repeats without further action. If so, then the process exits decision block 554 via the YES path, and in decision block 556 it is determined whether the requested line has its victim flag set true. If not, then the process exits decision block 556 via the NO path and the requested line is back invalidated in block 560 before writing the line back in block 558. If however, the requested line does have its victim flag set true, then the process exits decision block 556 via the YES path, and the cache line advantageously does not need back invalidation before writing the line back in block 558. In either case the process may then repeat.

Figure 6:
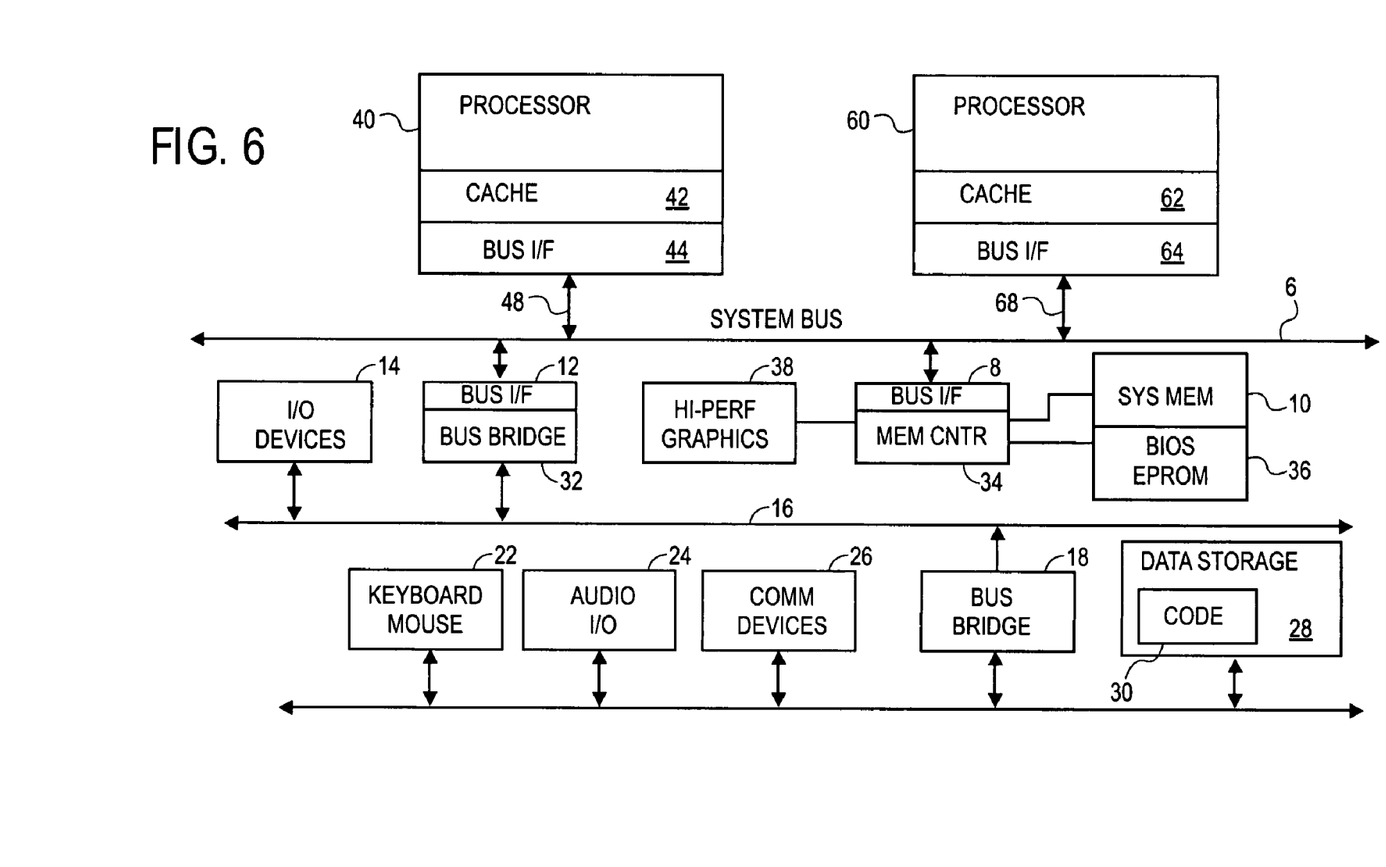
FIG. 6 is a schematic diagram of a microprocessor system, according to one embodiment of the present disclosure.

Referring now to FIG. 6, a schematic diagram of a microprocessor system is shown, according to one embodiment of the present disclosure. The FIG. 6 system may include several processors of which only two, processors 40, 60 are shown for clarity. Processors 40, 60 may include level two caches 42, 62, and other caches (not shown) inner to level two caches 42, 62. The FIG. 6 multiprocessor system may have several functions connected via bus interfaces 44, 64, 12, 8 with a system bus 6. In one embodiment, system bus 6 may be the front side bus (FSB) utilized with Pentium® class microprocessors manufactured by Intel® Corporation. In other embodiments, other busses may be use, or point-to-point interfaces may be used instead of a bus for memory access. In some embodiments memory controller 34 and bus bridge 32 may collectively be referred to as a chipset. In some embodiments, functions of a chipset may be divided among physical chips differently than as shown in the FIG. 6 embodiment.

Memory controller 34 may permit processors 40, 60 to read and write from system memory 10 and from a basic input/output system (BIOS) erasable programmable read-only memory (EPROM) 36. In other embodiments, memory controller 34 may connect via a point-to-point interface to level two cache 42 of processor 40, eliminating bus interfaces 44, 8. In some embodiments BIOS EPROM 36 may utilize flash memory. Memory controller 34 may include a bus interface 8 to permit memory read and write data to be carried to and from bus agents on system bus 6. Memory controller 34 may also connect with a high-performance graphics circuit 38 across a high-performance graphics interface 39. In certain embodiments the high-performance graphics interface 39 may be an advanced graphics port AGP interface. Memory controller 34 may direct read data from system memory 10 to the high-performance graphics circuit 38 across high-performance graphics interface 39.

Bus bridge 32 may permit data exchanges between system bus 6 and bus 16, which may in some embodiments be a industry standard architecture (ISA) bus or a peripheral component interconnect (PCI) bus. There may be various input/output I/O devices 14 on the bus 16, including in some embodiments low performance graphics controllers, video controllers, and networking controllers. Another bus bridge 18 may in some embodiments be used to permit data exchanges between bus 16 and bus 20. Bus 20 may in some embodiments be a small computer system interface (SCSI) bus, an integrated drive electronics (IDE) bus, or a universal serial bus (USB) bus. Additional I/O devices may be connected with bus 20. These may include keyboard and cursor control devices 22, including mice, audio I/O 24, communications devices 26, including modems and network interfaces, and data storage devices 28. Software code 30 may be stored on data storage device 28. In some embodiments, data storage device 28 may be a fixed magnetic disk, a floppy disk drive, an optical disk drive, a magneto-optical disk drive, a magnetic tape, or non-volatile memory including flash memory.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A cache, comprising:
a plurality of ways to store cache lines, each way to include a valid flag and a victim flag; and
a control logic to make true a first victim flag of a first one of said ways when none of said valid flags is false.

2. The cache of claim 1, wherein said control logic is to make false said first victim flag of said first one of said ways when an inner cache to said cache requests a cache line of said first one of said ways.

3. The cache of claim 2, wherein said control logic is to make true a second victim flag of a second one of said ways and send said cache line to said inner cache.

4. The cache of claim 1, wherein said control logic is to overwrite contents of said first one of said ways when said first victim flag is true.

5. The cache of claim 1, wherein said victim flag is an encoded number of one of said ways within a set.

6. The cache of claim 1, wherein said victim flag is a decoded bit associated with one of said ways.

7. The cache of claim 1, wherein said valid flag is encoded in a coherency field associated with one of said ways.

8. The cache of claim 1, wherein said valid flag is a decoded bit associated with one of said ways.

9. A method, comprising:
selecting a first victim cache line from a set of cache lines within a set of ways in an outer cache;
making true a first victim flag for said first victim cache line in a first one of said set of ways; and
overwriting said first victim cache line in said first one of said set of ways.

10. The method of claim 9, further comprising invalidating said first victim cache line in an inner cache.

11. The method of claim 9, further comprising requesting said first victim cache line from an inner cache and making false said first victim flag.

12. The method of claim 11, further comprising sending said first victim cache line to said inner cache and selecting a second victim cache line in a second one of said set of ways.

13. The method of claim 12, further comprising making true a second victim flag for said second victim cache line in said second one of said set of ways responsive to a determination that no cache line in said set of ways is invalid.

14. A system, comprising:
a cache including a plurality of ways to store cache lines, each way to include a valid flag and a victim flag, and a control logic to make true a first victim flag of a first one of said ways when none of said valid flags is false;
a memory interface to connect said cache with a memory;
a first bus;
an input/output bus; and
an audio input/output device coupled to said input/output bus to send data to said memory via said first bus and said memory interface.

15. The system of claim 14, wherein said control logic is to make false said first victim flag of said first one of said ways when an inner cache to said cache requests a cache line of said first one of said ways.

16. The system of claim 15, wherein said control logic is to make true a second victim flag of a second one of said ways and send said cache line to said inner cache.

17. The system of claim 14, wherein said control logic is to overwrite contents of said first one of said ways when said first victim flag is true.

18. A cache, comprising:
means for selecting a first victim cache line from a set of cache lines within a set of ways in an outer cache;
means for making true a first victim flag for said first victim cache line in a first one of said set of ways; and
means for overwriting said first victim cache line in said first one of said set of ways.

19. The cache of claim 18, further comprising means for invalidating said first victim cache line in an inner cache.

20. The cache of claim 18, further comprising means for requesting said first victim cache line from an inner cache and means for making false said first victim flag.

21. The cache of claim 20, further comprising means for sending said first victim cache line to said inner cache and means for selecting a second victim cache line in a second one of said set of ways.

22. The cache of claim 21, further comprising means for making true a second victim flag for said second victim cache line in said second one of said set of ways responsive to a determination that no cache line in said set of ways is invalid.

* * * * *